Figure 1:
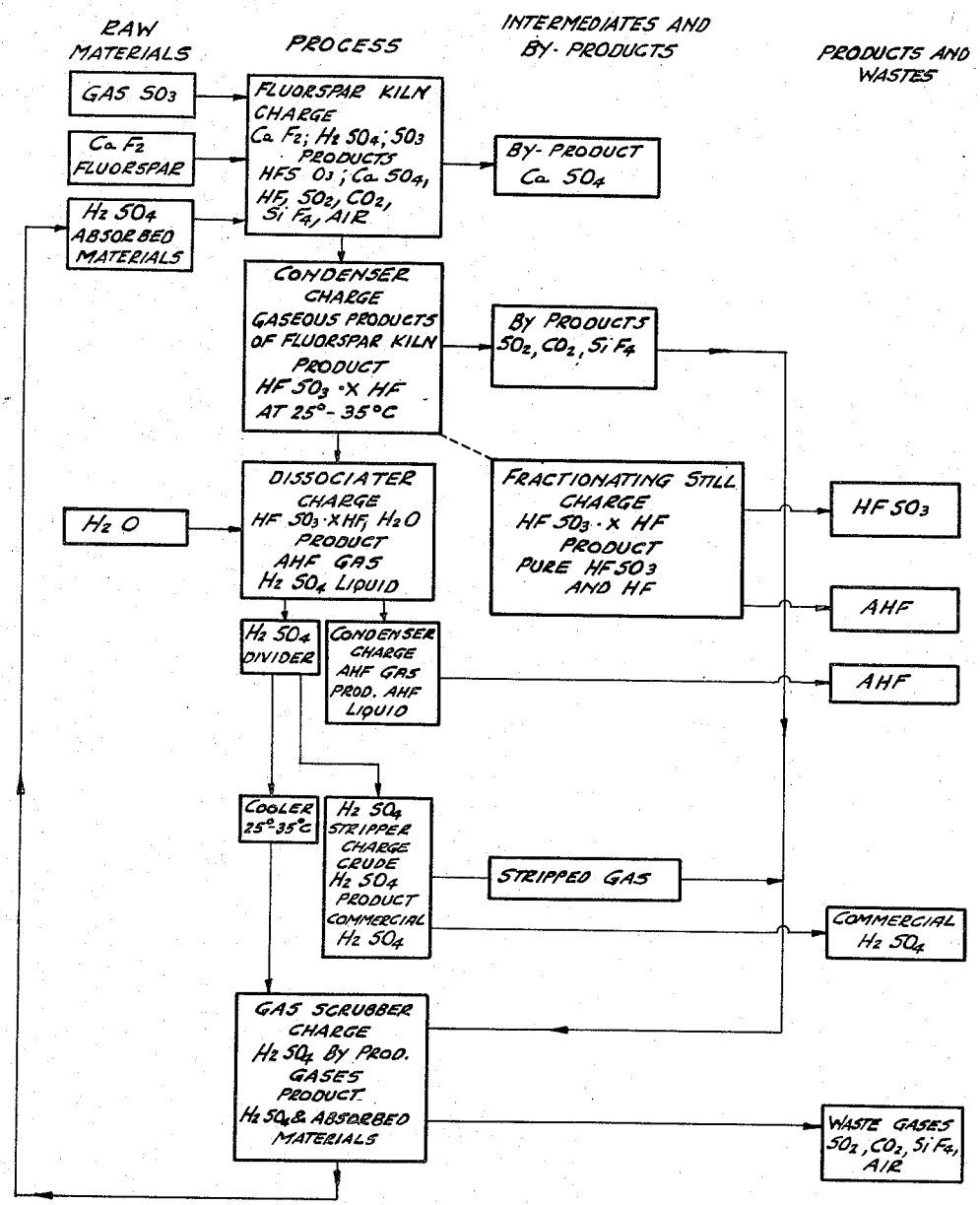

Feb. 15, 1955   W. F. MITCHELL ET AL   2,702,233
PRODUCTION OF HYDROGEN FLUORIDE
Filed Aug. 13, 1949   2 Sheets-Sheet 2

INVENTORS
William F. Mitchell
BY J. A. Grant Mackay
Harold L. Werner

United States Patent Office 2,702,233
Patented Feb. 15, 1955

2,702,233

PRODUCTION OF HYDROGEN FLUORIDE

William F. Mitchell, Drexel Park, and John A. Grant-MacKay, Ambler, Pa., assignors to The Pennsylvania Salt Manufacturing Company, Philadelphia, Pa., a corporation of Pennsylvania Application August 13, 1949, Serial No. 110,198

4 Claims. (Cl. 23—153)

This invention relates to improvements in the production of hydrogen fluoride and more particularly to the production of substantially pure anhydrous hydrogen fluoride with a minimum of operations.

Hydrogen fluoride is generally prepared commercially by the reaction of fluorspar and sulfuric acid. The exit gases from the reaction furnace contain, in addition to hydrogen fluoride, variable quantities of inert diluents such as air, $CO_2$, water vapor, $SO_2$ and frequently substantial quantities of $SiF_4$. Considerable difficulty has heretofore been encountered in manufacturing, from the hydrogen fluoride thus produced, concentrated hydrofluoric acid substantially free from the above mentioned impurities.

In order to separate the hydrogen fluoride from the diluting impurities, particularly water and $SiF_4$, the prior art has heretofore relied on the use of refrigeration, the absorption of hydrogen fluoride in dilute hydrogen fluoride water solutions with subsequent fractional distillation, or the use of elaborate absorption trains involving selective absorbing materials such as sulfuric acid or fluosulfonic acid. However, none of these methods have proved to be entirely satisfactory, particularly because of the large volume of dilute and mixed acids such as hydrofluoric-hydrofluosilicic acids incidentally produced at various points in the process, which, for their separation, require a succession of costly operations such as fractional distillation to obtain salable products.

We have now discovered that if fluosulfonic acid is first produced from fluorspar by reaction with sulfur trioxide and sulfuric acid, or, alternatively, if hydrogen fluoride is converted into fluosulfonic acid substantially as it is formed in the fluorspar furnace by reaction of the hydrogen fluoride with sulfur trioxide, and the fluosulfonic acid then decomposed into hydrogen fluoride and sulfuric acid by the controlled addition of water, a substantially anhydrous hydrogen fluoride substantially free of the above mentioned impurities may be produced in a minimum of operations. Our process permits good separation of silica containing by-products at an early stage in the process, with minimum loss of hydrogen fluoride. Our process, besides being simpler to operate than the prior art processes, has the added advantage of being readily operable as a continuous process for the production of hydrogen fluoride. Also, the process can produce in addition to hydrogen fluoride, fluosulfonic acid and sulfuric acid, both of which materials are of commercial value, and the process has the advantage that hydrogen fluoride alone may be withdrawn as the end product or either or both of the other two compounds may also be withdrawn in varying amounts from the process, depending on the market demand at time of production. An additional advantage of our process is that a substantial portion of the heat which must be supplied to the fluorspar furnace may be supplied through the medium of the sulfur trioxide added. The sulfur trioxide, as it leaves the sulfur dioxide converter in which it is produced, is generally at a temperature of over 400° C. The addition of this hot gas reduces considerably the amount of heat which must be supplied through other means to the fluorspar furnace. One of the problems encountered in the operation of fluorspar furnaces is that the heat applied to the exterior of the furnace, in order to raise the temperature of the reactants sufficient to complete the reaction, is of such magnitude that it tends to burn out the outer casing of the furnace thus necessitating relatively frequent shut-downs for repair or replacement. Consequently, by the addition of the hot sulfur trioxide, there is less tendency for the shell or casing of the fluorspar furnace to become damaged.

In practicing our invention, the fluosulfonic acid may be produced either by adding sulfur trioxide to the sulfuric acid and fluorspar in the fluorspar furnace, in which case fluosulfonic gases and vapors exit from the furnace, or by the addition of sulfur trioxide gas to the exit gases of the fluorspar furnace. In the latter case, the sulfur trioxide reacts with the hydrogen fluoride in the exit gases to form fluosulfonic acid. In both cases the resulting gas mixture, consisting of fluosulfonic acid together with an excess of either hydrogen fluoride or sulfur trioxide, and the aforementioned contaminating gases, is passed through a condenser where it is preferably cooled to 25 to 45° C. so as to condense out substantially all the fluosulfonic acid contained therein. Since the boiling points of the diluent gases, such as air, $CO_2$ (subl. $-78.5°$ C.), $SO_2$ (B. P. $-10°$ C.) and $SiF_4$ (B. P. $-65°$ C.) are considerably below room temperature, substantially none of these gases are condensed along with the fluosulfonic acid. The fluosulfonic acid, therefore, has a high degree of purity except for the possible presence of an excess of either hydrogen fluoride or sulfur trioxide, for which gases it has a high affinity, and possibly small amounts of sulfuric acid.

The liquid fluosulfonic acid may be passed directly to the decomposer where it is decomposed by hydrolysis into sulfuric acid and hydrogen fluoride in accordance with the equation $HFSO_3 + H_2O \rightarrow H_2SO_4 + HF\uparrow$. If, as is sometimes the case, it is found that some impurities such as dusts, mists, etc. from the fluorspar furnace have been trapped in the condensed fluosulfonic acid, it may be desirable to purify the fluosulfonic acid before passing it to the decomposer. This may be accomplished by passing the fluosulfonic acid through a fractionating still. In practice, however, the fluosulfonic acid will be found to have substantially no impurities except possibly dissolved hydrogen fluoride or sulfur trioxide. This is particularly true if the dusts and mists have been filtered out of the exit gases before they are cooled to condense out the fluosulfonic acid.

The proportion of sulfur trioxide, introduced into the process, to the hydrogen fluoride, produced by the reaction, determines whether hydrogen fluoride or sulfur trioxide will be found in the condensed fluosulfonic acid. If the amount of sulfur trioxide added is small with respect to the amount of hydrogen fluoride produced, substantial quantities of hydrogen fluoride will be found to have been absorbed in the condensed fluosulfonic acid. If the quantity of sulfur trioxide used is in excess of the amount needed to react with the hydrogen fluoride produced, the condensed fluosulfonic acid will contain absorbed sulfur trioxide, the quantity being dependent on the amount of excess sulfur trioxide added. In practice, we prefer to control the addition of sulfur trioxide so that there is a substantial amount of unreacted hydrogen fluoride together with the fluosulfonic acid in the gases when they are passed to the condenser.

It has been known heretofore that the addition of water to fluosulfonic acid causes the acid to decompose in accordance with the equation $$HFSO_3 + H_2O \rightleftharpoons H_2SO_4 + HF$$

Early experimenters also noted that the reaction, when water was added to fluosulfonic acid, proceeded with almost explosive violence. However, it is not believed that it was known prior to our invention that the reaction between fluosulfonic acid and water can be controlled so as to proceed evenly and rapidly to produce substantially anhydrous hydrogen fluoride which, despite the reversibility of the reaction, can be substantially completely discharged from the system, as a gas, without using such an excess of water that any appreciable amount of it is vaporized with the hydrogen fluoride. Normally one would expect that substantial quantities of water vapor would be found together with the hydrogen fluoride evolved. However, by controlling the reaction rate so as to produce a rapid but not violent reaction, substantially pure anhydrous hydrogen fluoride may be obtained. Also, by use of what might be considered a series of decomposition chambers, the reaction can be carried sufficiently to the right that the liquid leaving the decomposer has a sulfuric acid content of over 85%. The controlled reaction of the water and fluosulfonic acid is obtained by carrying out the hydrolysis in successive stages, the water added to the fluosulfonic acid solution in each stage being substantially less than the amount of water required to fully hydrolyze all of the fluosulfonic acid, the fluosulfonic acid solution becoming more and more diluted with sulfuric acid in each succeeding stage. The final sulfuric acid product, or a portion thereof, may be returned directly to the fluorspar furnace together with fresh fluorspar and sulfur trioxide. Since the amount of sulfuric acid removed from the decomposer is directly dependent on the quantity of sulfur trioxide added, we prefer, when hydrogen fluoride is the primary end product desired, to operate the first part of our process (the production of the fluosulfonic acid) so as to obtain one mol of unreacted hydrogen fluoride for each mol of fluosulfonic acid produced. This gives, on decomposition of the fluosulfonic acid, one mol of sulfuric acid for every mol of sulfuric acid added to the fluorspar furnace. However, where it is also desired to produce fluosulfonic acid or sulfuric acid, the amount of sulfur trioxide can be increased to such a degree that substantially twice as much fluosulfonic acid is formed and if decomposed, approximately twice as much sulfuric acid is removed from the decomposer as is necessary to operate the fluorspar furnace. The excess fluosulfonic acid or sulfuric acid can then be separated from the process, purified and sold or used for some other purpose.

Figure 2:
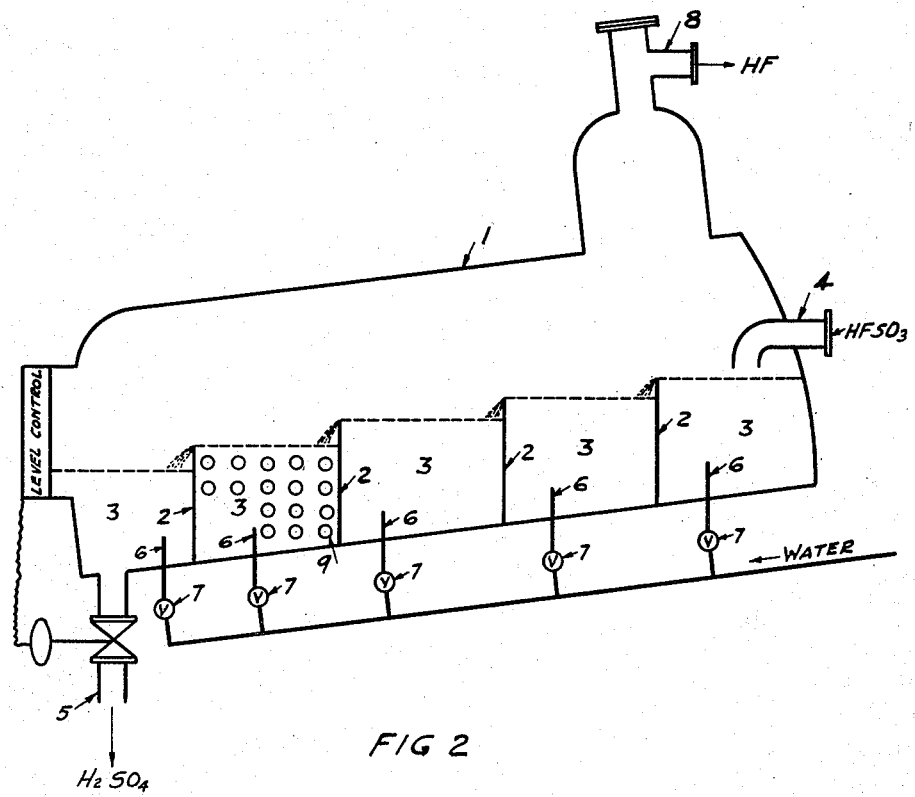

In order to better illustrate the practice of our invention, reference is had to the accompanying drawings in which:

Figure 1 is a flow sheet illustrating the practice of the invention on the hydrogen fluoride side as a continuous process; and Figure 2 is a schematic drawing of a suitable decomposer giving a cross-sectional view of the same.

The flow sheet illustrated in Figure 1 is believed to be self-explanatory and, therefore, to require little discussion. As illustrated in Figure 1, the system is operated on the hydrogen fluoride side rather than on the sulfur trioxide side, this being our preferred method of operation. However, as above explained, this is a matter of choice. If the system were to be operated on the sulfur trioxide side, the flow sheet would be substantially the same, the only differences being that sulfur trioxide would be illustrated as being present with the uncondensed gases leaving the first condenser shown, with the condensed fluosulfonic acid and as the gas removed from the fractionating still when purifying the fluosulfonic acid. The separated sulfur trioxide would then preferably be returned to the reactor. The dotted line leading from the first condenser shown to the fractionating still diagonally below it, represents alternative operation which can be carried on simultaneously with the principal process, when it is desired to separate a purified fluosulfonic acid.

Referring to Figure 2, the decomposer is shown as comprising a closed chamber 1 divided through partitions 2 into a plurality of separate chambers 3. The partitions are so arranged that the fluosulfonic acid entering the decomposer through inlet 4 passes successively through each of the chambers 3 before finally leaving the decomposer through outlet 5. Each of the chambers is provided with a water inlet 6 through which water is fed into the chamber in a fine stream. The rate at which the water enters is controlled through valves 7 so as to produce a rapid though not violent reaction. The portion of the water inlets from which the water passes directly into the fluosulfonic acid should preferably be made of a corrosion resistant material, platinum being suitable. As the fluosulfonic acid flows from one chamber of the decomposer to the next, the concentration of fluosulfonic acid continuously decreases whereas the concentration of sulfuric acid present continuously increases, the liquid leaving through exit 5 being substantially all sulfuric acid. The hydrogen fluoride produced through the decomposition of the fluosulfonic acid is removed from the decomposer through gas exit 8. In order to control the temperature of the fluosulfonic acid coils 9 may be provided. For the purpose of simplicity, the coils 9 are shown as being only in one of the chambers 3. However, in practice they would be present in all the chambers. Obviously other types of apparatus may be employed in which the fluosulfonic acid could be decomposed in successive stages without departing from the scope of the invention.

In carrying out our invention the fluorspar furnace is first charged, in the conventional manner, with fluorspar and sulfuric acid. Preferably only sufficient sulfur trioxide is added to convert about half of the hydrogen fluoride produced to fluosulfonic acid and to react with any water which may be present in the fluorspar. Where the fluorspar is substantially free from moisture, the amount of sulfur trioxide used is preferably about .8 to 1 part by weight sulfur trioxide to each part by weight of sulfuric acid used. The amount of sulfuric acid in the charge should preferably be in excess of the fluorspar added, it being preferred to add about 130 pounds of 98% sulfuric acid for every 100 pounds of acid grad fluorspar. The sulfur trioxide may be added together with the sulfuric acid as fuming sulfuric acid. However, we prefer to use the sulfur trioxide as it comes direct from a sulfur dioxide converter so as to utilize the heat therein in heating the fluorspar and sulfuric acid reactants.

The exit gases from the fluorspar furnace, which are at a temperature of from 170 to 300° C., are passed directly into a condenser where they are cooled to about 30° C. From the condenser the liquid fluosulfonic acid together with substantial quantities of absorbed hydrogen fluoride is passed to the decomposer. The amount of water added to each of the separate chambers 3 of the decomposer is, of course, only a fraction of the total water needed for complete decomposition of the fluosulfonic acid. Preferably the water is added in sufficiently small increments or at a sufficiently slow rate that the decomposition reaction is completed substantially at the point of entry of the water. The heat of the reaction drives off the absorbed hydrogen fluoride so that the hydrogen fluoride recovered from the decomposer may be substantially greater than the theoretical yield which would be obtained through the decomposition of the fluosulfonic acid alone.

In order to prevent the loss of any hydrogen fluoride which is not absorbed by the condensing fluosulfonic acid, the exit sulfuric acid from the decomposer is cooled to 25 to 40° C. and used to scrub the exit gases from the fluosulfonic acid condenser. Since air, $SO_2$, $CO_2$ and $SiF_4$ are substantially insoluble in high concentrations of sulfuric acid whereas hydrogen fluoride is highly soluble therein, substantial separation of any hydrogen fluoride which may be present is obtained at this point. The same is true where the system is run on the sulfur trioxide side, concentrated sulfuric acid having a high affinity for sulfur trioxide. The sulfuric acid scrub liquor is then returned to the fluorspar furnace together with fresh fluorspar and sulfur trioxide.

Since the water added in the decomposer is substantially all converted to sulfuric acid, the process eliminates the problems caused by water being present. Also, fluosulfonic acid, hydrogen fluoride and concentrated sulfuric acid all being substantially non-corrosive to steel in the absence of water, the equipment employed, except for the tips of the water inlets used in the decomposer, may be made of low priced ordinary mild steel.

Having described our invention, we claim:

1. In a process for making hydrogen fluoride substantially free from $SiF_4$, the steps comprising charging a reactor with substantially equal molar quantities of fluorspar and sulfuric acid together with 1 to 2 mols sulfur trioxide for each mol sulfuric acid used to form fluosulfonic acid said fluosulfonic acid being present in the gaseous state together with diluent gases including $SiF_4$, cooling said gases to between 5° and 150° C. to condense out said fluosulfonic acid so as to separate the same from said diluent gases, hydrolyzing said fluosulfonic acid in successive stages by adding thereto in each stage, water, in an amount substantially less than that required to hydrolyze all of the fluosulfonic acid to form sulfuric acid and substantially anhydrous hydrogen fluoride, scrubbing the uncondensed gases from said condensing step with sulfuric acid obtained from said decomposition step and returning said sulfuric acid used for scrubbing to said reactor together with fresh quantities of fluorspar and sulfur trioxide.

2. A method of making substantially anhydrous hydrogen fluoride comprising hydrolyzing a solution of fluosulfonic acid successive stages to produce sulfuric acid and hydrogen fluoride, each stage containing less fluosulfonic acid in the solution than the preceding stage by adding the water used in the hydrolysis in each stage in a fine stream below the surface of the fluosulfonic acid solution while removing hydrogen fluoride thus formed, the water added in each stage being substantially less than that required to hydrolyze all of the fluosulfonic acid.

3. A method of making substantially anhydrous hydrogen fluoride comprising hydrolyzing in successive stages to liquid fluosulfonic acid to form sulfuric acid and hydrogen fluoride and removing hydrogen fluoride as formed from each stepwise addition of water, the amount of said water used in any of such stages being less than that necessary to complete the decomposition of the fluosulfonic acid.

4. In a process for making substantially pure anhydrous hydrogen fluoride, the steps comprising reacting in a reactor fluorspar, sulfuric acid and sulfur trioxide to form fluosulfonic acid, condensing said fluosulfonic acid, adding water to said condensed fluosulfonic acid in an amount substantially less than that necessary to decompose all of said fluosulfonic acid into sulfuric acid and hydrogen fluoride, removing the hydrogen fluoride formed, removing the resulting liquor, adding water to said resulting liquor in an amount insufficient to completely decompose the fluosulfonic acid therein to sulfuric acid and hydrogen fluoride, removing the hydrogen fluoride formed, removing the resulting liquor which now has an increased percentage of sulfuric acid therein, continuing the stepwise decomposition of said fluosulfonic acid until substantially all of said fluosulfonic acid has been decomposed into sulfuric acid and hydrogen fluoride and returning sulfuric acid formed by said decomposition to said reactor.

References Cited in the file of this patent

UNITED STATES PATENTS

| Number | Name | Date |
|---|---|---|
| 1,316,569 | Fickes | Sept. 23, 1919 |
| 2,410,043 | Breton et al. | Oct. 29, 1946 |
| 2,456,509 | Hopkins | Dec. 14, 1948 |

OTHER REFERENCES

J. W. Mellor's "A Comprehensive Treatise on Inorganic and Theoretical Chem.," vol. 10, 1930 ed., page 684. Longmans, Green and Co., N. Y.

Fritz Ephraim's "Inorganic Chem.," page 596, Fourth ed. revised, 1943. Nordeman Pub. Co., N. Y.